United States Patent [19]

Robinson

[11] Patent Number: 5,570,112
[45] Date of Patent: Oct. 29, 1996

[54] ERGONOMIC COMPUTER MOUSE

[76] Inventor: Calvin H. A. Robinson, 100 Golf Links Rd., Apt. 318, Sierra Vista, Ariz. 85635

[21] Appl. No.: 322,175

[22] Filed: Oct. 12, 1994

[51] Int. Cl.⁶ .................................................. G09G 5/08
[52] U.S. Cl. .................. 345/163; 345/157; 248/118; 273/148 B
[58] Field of Search .............................. 345/156, 157, 345/163, 164, 165, 166, 167; 248/118, 118.1, 118.3, 118.5; 273/148 B

[56] References Cited

U.S. PATENT DOCUMENTS

| D. 303,662 | 9/1989 | Hsiao et al. | D14/114 |
|---|---|---|---|
| D. 310,521 | 9/1990 | Leung | D14/114 |
| D. 328,892 | 8/1992 | Miller | D14/114 |
| D. 331,045 | 11/1992 | Moerke | D14/114 |
| D. 331,229 | 11/1992 | Pike | D14/114 |
| D. 331,575 | 12/1992 | Pike | D14/114 |
| 4,862,165 | 8/1989 | Gart | 345/163 |
| 4,973,176 | 11/1990 | Dietrich | 273/148 B |
| 5,165,630 | 11/1992 | Connor | 248/118.1 |
| 5,203,845 | 4/1993 | Moore | 345/166 |
| 5,252,970 | 10/1993 | Baronowsky | 345/164 |
| 5,280,276 | 1/1994 | Kwok | 345/167 |

*Primary Examiner*—Mark R. Powell
*Assistant Examiner*—Matthew Luu
*Attorney, Agent, or Firm*—Michael I. Kroll

[57] ABSTRACT

An improved computer mouse is provided for a computer, having a monitor and keyboard and a computer mouse pad, which consists of a housing to move about a computer mouse pad on a desk top or other flat, level surface. A soft foam rubber structure is built into the housing for supporting a wrist and palm of a computer operator in comfort, when the operator moves the housing about the computer mouse pad on the desk top.

1 Claim, 2 Drawing Sheets

5,570,112

ERGONOMIC COMPUTER MOUSE

BACKGROUND OF THE INVENTION

1. Field of the Invention

The instant invention relates generally to computer hardware accessories and more specifically it relates to an ergonomic computer mouse.

2. Description of the Prior Art

Numerous computer hardware accessories have been provided in prior art. For example, U.S. Pat. Nos. Des. 303,662 to Hsiao et al.; 310,521 to Leung; 328,892 to Miller; 331,045 to Moerke; 331,229 to Pike; 331,575 to Pike and 5,203,845 to Moore all are illustrative of such prior art. While these units may be suitable for the particular purpose to which they address, they would not be as suitable for the purposes of the present invention as heretofore described.

Hsiao, Howell

Pfeifer, Herbert

CURSOR CONTROL

The ornamental design is provided for a cursor control, as shown.

FIG. 4 is a front elevational view thereof.

FIG. 5 is a left side elevational view thereof.

FIG. 6 is a back elevational view thereof.

FIG. 7 is a bottom plan view thereof.

Leung, Donny

COMBINED DRAWING TABLET AND CURSOR CONTROL FOR COMPUTER

U.S. Patent No. Des. 310,521

The ornamental design is provided for a combined drawing tablet and cursor control for computer, as shown and described.

Figure 1:
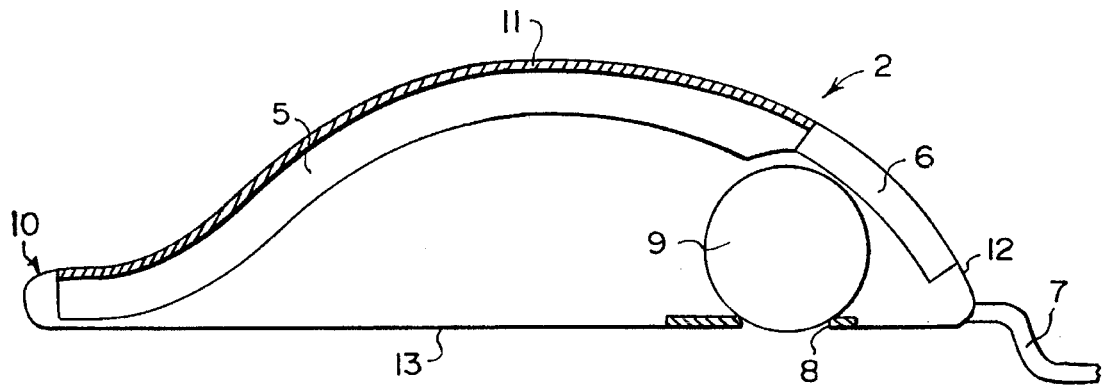
FIG. 1 is a top, front, right side perspective view of the cursor control showing a new design.

FIG. 1 is a top plan view of combined drawing tablet and cursor control for computer showing a new design.

Figure 2:
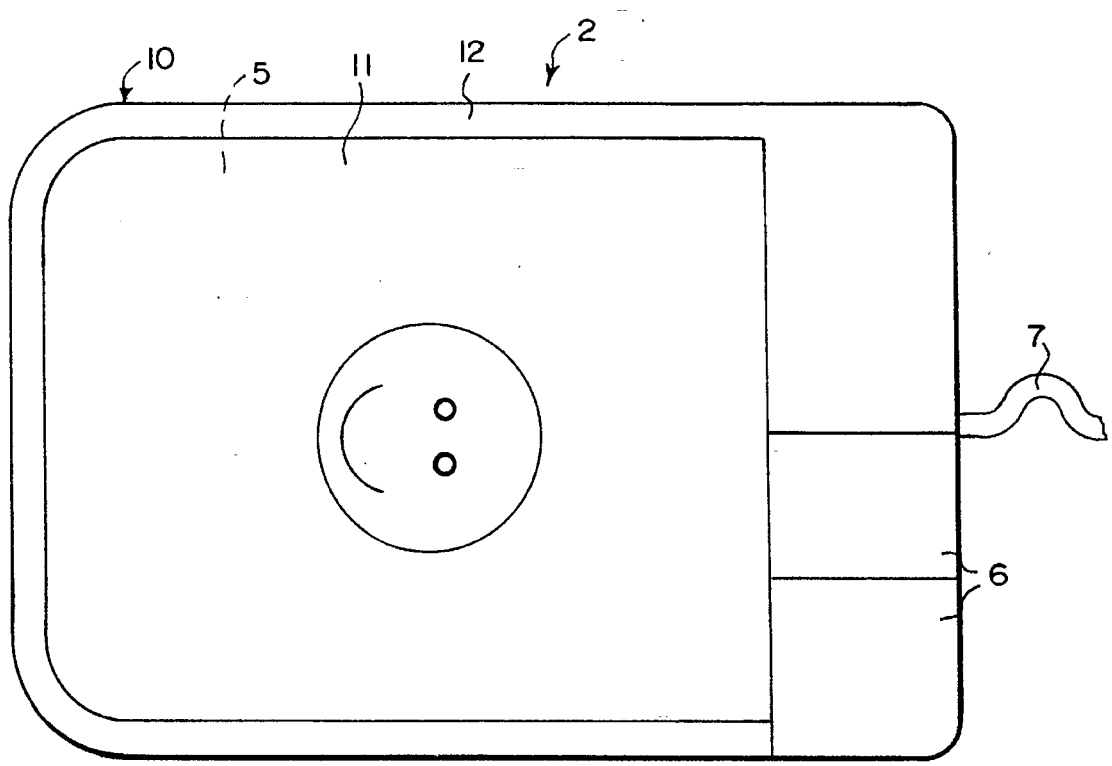
FIG. 2 is a top plan view thereof.

FIG. 2 is a left side elevational view thereof.

Figure 3:
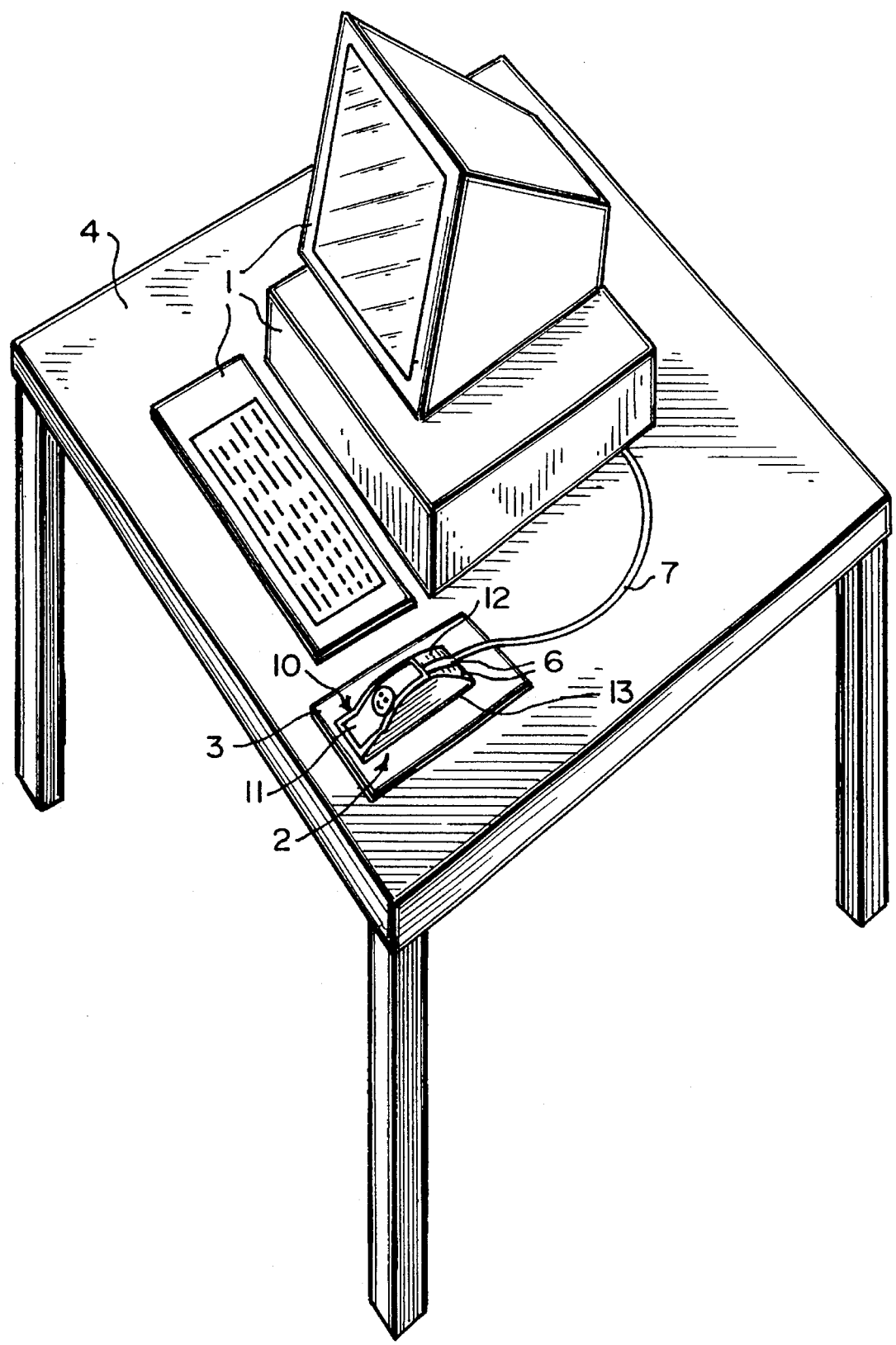
FIG. 3 is a right side elevational view thereof.

FIG. 3 is a right side elevational view thereof.

FIG. 4 is a rear elevational view thereof.

FIG. 5 is a front elevational view thereof.

FIG. 6 is a bottom plan view thereof.

FIG. 7 is a top plan view of the cursor control.

FIG. 8 is a left side elevational view thereof.

FIG. 9 is a right side elevational view thereof.

FIG. 10 is a rear elevational view thereof.

FIG. 11 is a front elevational view thereof.

FIG. 12 is a bottom plan view thereof.

FIG. 13 is a top, front right perspective view thereof.

The cursor control is omitted from FIGS. 2, 3, 4 and 5 and the drawing tablet is omitted from FIGS. 7–12 for convenience of illustration.

Miller, Brent A.

COMBINED WRIST REST AND PAD FOR USE WITH COMPUTER MOUSE

U.S. Pat. No. Des. 328,892

The ornamental design for a combined wrist rest and pad for use with computer mouse is provided, as shown and described.

FIG. 1 is a top plan view of a combined wrist rest and pad for use with computer mouse, showing a new design.

FIG. 2 is a front elevational view thereof.

FIG. 3 is a left side elevational view thereof, the right side elevational view being the mirror image thereof.

FIG. 4 is a rear elevational view thereof.

FIG. 5 is a bottom plan view thereof.

Moerke, Duane

COMBINED COMPUTER KEYBOARD AND MOUSE PAD DRAWER

U.S. Pat. No. Des. 331,045

The ornamental design for the combined computer keyboard and mouse pad drawer is provided, as shown and described.

FIG. 1 is an isometric view of a combined computer keyboard and mouse pad drawer showing a new design.

FIG. 2 is a left side elevational view thereof, the right side being a mirror image.

FIG. 3 is a right side cross-sectional view thereof, taken on line 3—3 of FIG. 1.

FIG. 4 is a front elevational view thereof.

FIG. 5 is a top plan view thereof.

FIG. 6 is a rear elevational view thereof.

FIG. 7 is a bottom plan view thereof.

FIG. 8 is a left side cross-sectional view thereof, taken on line 8—8 of FIG. 1.

Pike, Timothy D.

COMPUTER KEYBOARD DECAL

U.S. Pat. No. Des. 331,229

The ornamental design is provided for a computer keyboard decal, as shown and described.

FIG. 1 is a top plan view of a letter with hands design keyboard graphics overlay showing a new design, the bottom plan view being identical.

FIG. 2 is a front elevational view thereof.

FIG. 3 is a right-side elevational view thereof, the left-side elevational view being identical.

FIG. 4 is a rear elevational view thereof.

Pike, Timothy D.

COMPUTER KEYBOARD DECAL

U.S. Pat. No. Des. 331,575

The ornamental design for a computer keyboard decal is provided, as shown and described.

FIG. 1 is a top plan view of a computer keyboard decal showing a new design, the bottom plan view being identical.

FIG. 2 is a front elevational view thereof.

FIG. 3 is a right-side elevational view thereof, the left-side elevational view being identical.

FIG. 4 is a rear elevational view thereof.

Moore, Edward

COMPUTER MOUSE SUPPORT

U.S. Pat. No. 5,203,845

There is disclosed a device having a working surface for a computer mouse which comprises a supporting structure having a forward end, a rear end, a pair of sides, a generally planar top working surface and a bottom surface adapted for engagement with a supporting surface. The planar top working surface is adapted to receive a mouse and extends from the forward end to the rear end in an upwardly inclined orientation. A wrist/palm support member is provided in cooperative engagement with the forward end.

SUMMARY OF THE INVENTION

A primary object of the present invention is to provide improved computer mouse comfort and computer cursor control that will overcome the shortcomings of the prior art devices.

Another object is to provide an improved ergonomic computer mouse that contains a built-in foam rubber wrist and palm support recessed in its housing, that in addition to curvature of the device, conforms to the shape of the human hand and can be utilized by a computer operator over a long period when the mouse is moved about a computer mouse pad or similar surface.

Another object is that the recessed foam rubber wrist and palm support have a surface which feature any image, so that the improved ergonomic computer mouse is pleasing to the computer operator.

A further object is to provide computer mouse and computer cursor control that is simple and easy to use by left-handled people or right-handed people, depending upon the construction of the device.

A still further object is to provide an improved computer mouse that is economical to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

FIG. 1 is a diagrammatic side "cut-a-way" view of in instant invention displaying the pertinent features of the instant invention.

FIG. 2 is an overhead top view of the instant invention displaying the pertinent features of the instant invention.

FIG. 3 is a perspective view of a computer on a desk top with the instant invention installed thereon.

DETAILED DESCRIPTION OF THE PREFERRED EMBODIMENTS

Turning now descriptively to the drawings, in which similar reference characters denote similar elements throughout the several views, FIGS. 1 through 3 illustrate an improved ergonomic computer mouse (2) for a computer with a monitor, CPU, and keyboard (1) all or some of which may rest on a desk top (4). The ergonomic mouse (2) must rest on a flat surface, such as a desk top. The device can be used on a computer mouse pad (3) or similar surface. A soft, foam rubber structure (5) is permanently built into a recessed area of the housing (10) of the device for supporting the wrist and palm of a computer operator in comfort, when the computer operator moves the device (2) about the mouse pad (3).

Two buttons (6) are located on the right side (as shown) or on the left side (not shown) for the convenience of the operator who may be left- or right-handed. When one or both buttons are pressed, a signal sent through a cord or data cable (7) which extends from the front center of the device which, when connected to the computer (1), will transfer signals from the device (2) to the computer (1) for cursor control.

The soft, foam rubber pad (5) has a thin fabric material (11) on its surface which can feature any image that would be pleasing to the operator. The fabric (11) and the housing (10) can be of any color, depending on the desires of the operator.

The housing (10), as shown in the drawings, contains an upper arch shaped wall (12) and a lower flat wall 13, as best seen in FIG. 1. Of note, variations in the shape of the upper wall (12) which are connatural in design can include (but are not limited to) increases and decreases in the angle of the arch, other archlike shapes, dome shapes of various sizes suggesting a circular device at its perimeter, or any sinuous or sinusoidal variations therein.

OPERATION OF THE INVENTION

The improved ergonomic computer mouse (2) is operated by resting the wrist and palm on the fabric (11) covering the soft, foam rubber pad (5). In all other respects, the mouse (2) is operated like any other computer mouse.

Of note, variations in the operation of the ergonomic mouse can also include the use of light beams generated by the mouse, which when the mouse is moved about a reflective metallic pad, it will electronically coordinate the movement of the cursor about the monitor.

LIST OF REFERENCE NUMBERS

1 Computer monitor, CPU, and keyboard
2 Improved Ergonomic Computer Mouse
3 Computer mouse pad or similar material
4 Desk top or similar flat surface
5 Soft, rubber foam material which is permanently inserted 6 Buttons for sending electronic signals to the computer (1)
7 Data cable or cord
8 Standard mouse ball aperture
9 Standard mouse ball
10 Light plastic housing with a recessed top surface
11 Thin fabric material which covers foam rubber material (5)
12 Upper curved surface of housing (10)
13 Lower flat surface of housing (10)

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. An improved ergonomic computer mouse for a computer having a monitor, CPU, and keyboard, a computer mouse pad or other similar material, and a desk top or other similar flat, level surface, which comprises:

a) a housing to be moved about the mouse pad on the desk top;

b) means formed in said housing for supporting a wrist and palm of a computer operator in comfort, when the computer operator moves said housing about the computer mouse pad on the desk top, said means for supporting said wrist and palm comprising an arch shaped upper surface of said housing conforming to the shape of said wrist and palm with a recess centrally located in and extending substantially the full length of said upper surface in contact with said wrist and palm, in which recess is permanently mounted a soft, foam rubber material over which is a thin covering layer of fabric material conforming with said arch shaped upper surface and not protruding therefrom; and c) two buttons in said housing to control a cursor on the monitor and a data cord extending from said housing to the computer to send a signal from said buttons to the computer to control the cursor on the monitor.

\* \* \* \* \*